US008854418B2

(12) United States Patent
Li et al.

(10) Patent No.: US 8,854,418 B2
(45) Date of Patent: *Oct. 7, 2014

(54) INTEGRATED MEDIA GATEWAY PROCESSING AND CONTROL TO REDUCE LATENCY FOR 2-WAY VIDEO CONFERENCE APPLICATIONS

(75) Inventors: Gordon Yong Li, San Diego, CA (US); Xuemin Chen, Rancho Santa Fe, CA (US); Arlen J Kirchoff, Jr., Suwanee, GA (US)

(73) Assignee: Broadcom Corporation, Irvine, CA (US)

( * ) Notice: Subject to any disclaimer, the term of this patent is extended or adjusted under 35 U.S.C. 154(b) by 635 days.

This patent is subject to a terminal disclaimer.

(21) Appl. No.: 13/170,503

(22) Filed: Jun. 28, 2011

(65) Prior Publication Data

US 2012/0300016 A1 Nov. 29, 2012

Related U.S. Application Data

(60) Provisional application No. 61/489,152, filed on May 23, 2011.

(51) Int. Cl.
*H04N 7/14* (2006.01)
*H04N 21/4363* (2011.01)
*H04N 21/436* (2011.01)
*H04N 21/643* (2011.01)
*H04N 21/845* (2011.01)
*H04N 7/15* (2006.01)
*H04L 12/18* (2006.01)

(52) U.S. Cl.
CPC ........... *H04N 7/152* (2013.01); *H04N 21/4363* (2013.01); *H04N 21/43615* (2013.01); *H04N 21/64322* (2013.01); *H04N 21/8456* (2013.01); *H04L 12/1827* (2013.01)
USPC ..................................... 348/14.09; 348/14.12

(58) Field of Classification Search
CPC ......... H04N 7/14; H04N 7/141; H04N 7/147; H04N 7/15; H04N 7/152
USPC ..................... 348/14.01, 14.08, 14.09, 14.12
See application file for complete search history.

(56) References Cited

U.S. PATENT DOCUMENTS

| 2004/0008635 | A1* | 1/2004 | Nelson et al. | 370/260 |
| 2012/0169836 | A1* | 7/2012 | Setlur | 348/14.11 |
| 2012/0300018 | A1* | 11/2012 | Li et al. | 348/14.09 |
| 2013/0021432 | A1* | 1/2013 | Kalipatnapu et al. | 348/14.09 |

* cited by examiner

*Primary Examiner* — Quoc D Tran
(74) *Attorney, Agent, or Firm* — Foley & Lardner LLP

(57) ABSTRACT

In a media gateway (MG) that enables communication with a plurality of client devices, at least a portion of video conferencing (VC) processing during a VC call between at least one of said plurality of client devices and at least one other VC client may be handled by the media gateway. The portion of the VC processing handled by said media is offloaded from a centralized VC multipoint control unit (MCU). The MG may handle one or more VC MCU functions, which may comprise video conferencing call control and/or management and/or audio/video (A/V) transcoding. The MG may adaptively control and/or configure latency associated with handling and/or communication of data by the media gateway's client device during the video conference call. The adaptive latency control and/or configuration may be based on determination of end-to-end latency associated with exchange of data during the video conference call.

19 Claims, 6 Drawing Sheets

US 8,854,418 B2

INTEGRATED MEDIA GATEWAY PROCESSING AND CONTROL TO REDUCE LATENCY FOR 2-WAY VIDEO CONFERENCE APPLICATIONS

CLAIM OF PRIORITY

This patent application makes reference to, claims priority to and claims benefit from U.S. Provisional Application Ser. No. 61/489,152 which was filed on May 23, 2011.

The above stated application is hereby incorporated herein by reference in its entirety.

CROSS-REFERENCE TO RELATED APPLICATIONS/INCORPORATION BY REFERENCE

This application also makes reference to:
U.S. application Ser. No. 13/171,097 filed on even date herewith;
U.S. application Ser. No. 13/171,123 filed on even date herewith;
U.S. application Ser. No. 13/170,653 filed on even date herewith;

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for integrated media gateway processing and control to reduce latency for 2-way video conference applications.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV, and/or Internet Protocol television (IPTV) based broadcasts. To protect against unauthorized reception and/or use of multimedia content, service providers may require use of dedicated set-top boxes (STBs) that may be used to decrypt broadcast signals or provide conditional access to information communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for integrated media gateway processing and control to reduce latency for 2-way video conference applications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
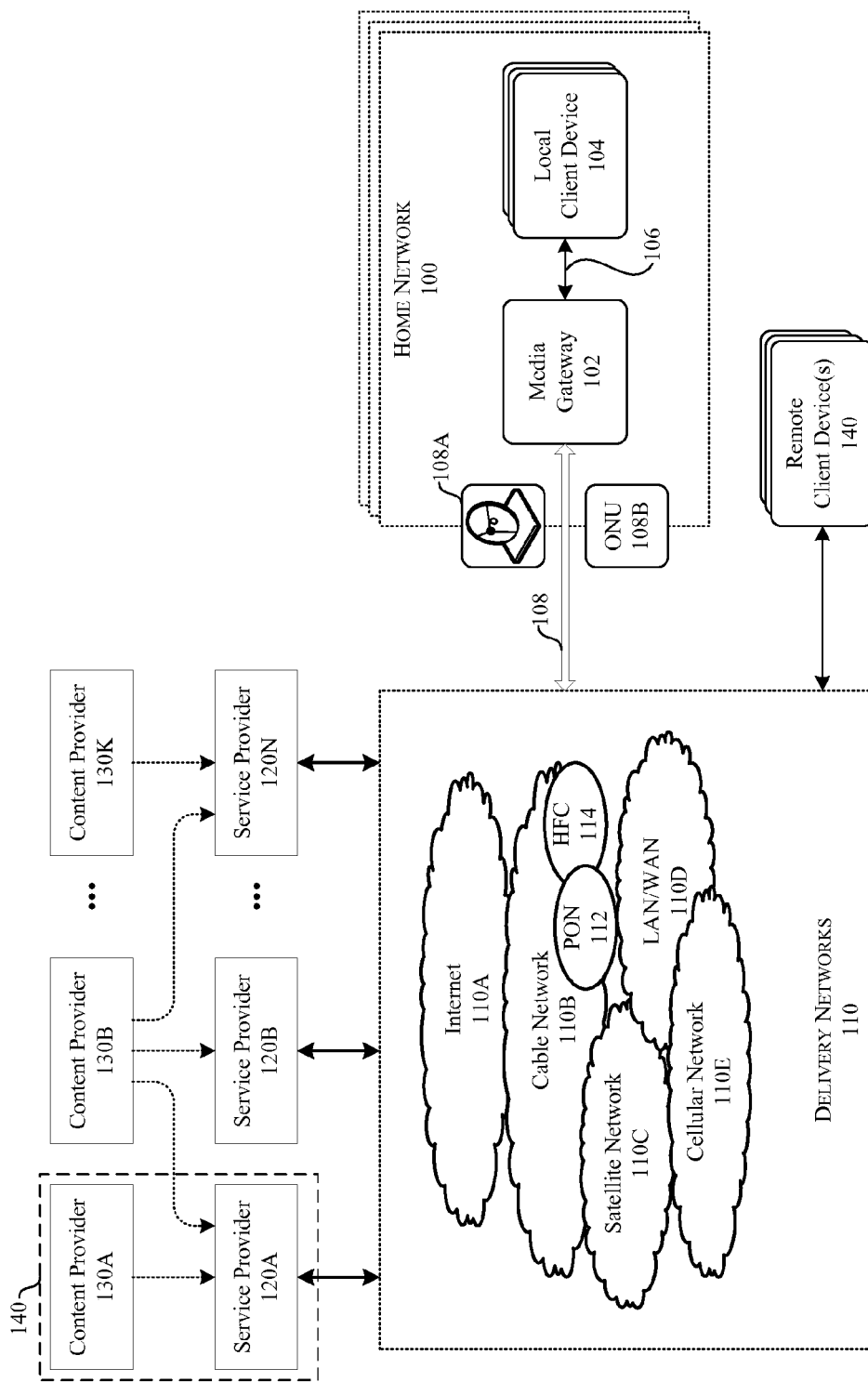
FIG. 1 is a block diagram illustrating an exemplary communication system that comprises a home network serviced by a home gateway, which may be utilized in accordance with an embodiment of the invention.

Certain embodiments of the invention may be found in a method and system for integrated media gateway processing and control to reduce latency for 2-way video conference applications. In various embodiments of the invention, a media gateway may be utilized to provide and/or support video conferencing (VC) services and/or applications in a network serviced by the media gateway. The media gateway may handle at least a portion of video conferencing (VC) processing during a video conference call between a client device serviced by the media gateway and one or more other video conferencing (VC) terminals. In this regard, at least a portion of video conferencing (VC) processing that is handled by the media gateway may be offload from one or more video conferencing (VC) multipoint control units (MCUs). The video conferencing (VC) multipoint control units (MCUs) are separate from the media gateway, and are located upstream of the location of the media gateway. Exemplary MCU functions may comprise control and/or management of video conferencing (VC) calls, and/or audio/video (A/V) transcoding associated with content exchanged during the video conferencing (VC) calls. The video conferencing (VC) call control and/or management may comprise determining and/or establishing routing paths utilized in exchanging data during video conference (VC) calls.

The media gateway may adaptively control and/or configure latency associated with handling and/or communication of data during the video conference calls. The latency control and/or configuration may be based on monitoring and/or determination of end-to-end latency associated with exchange of data during the video conference calls. In this regard, the end-to-end latency may be monitored and/or determined based on exchange of control information among the peer VC terminals and/or media gateways servicing the VC terminals. The control information may be exchanged via control channel(s), and may comprise information pertaining to transport of data and/or user preferences with respect to the VC calls.

The adaptive latency control and/or configuration may comprise setting and/or adjusting delay associate with various stages pertaining to handling of content, such as content capture, content encoding, content segmentation, and/or media gateway processing associated with communication of content. The delay associated with content capture, content encoding, content segmentation, and/or media gateway processing associated with communication of content may be configured and/or adjusted by modifying handling priority and/or resource allocation associated with the capture encoding and/or processing captured content, content encoding, content segmentation, and/or media gateway processing associated with communication of content. Configuring delay associated with content encoding and/or segmentation may be performed by selecting an encoding profile from a set of different encoding profiles. Each of the set of different encoding profiles may comprise information pertaining to audio and video resolutions, coder-decoder (CODEC) types, and/or lengths of audio and video segments.

FIG. 1 is a block diagram illustrating an exemplary communication system that comprises a home network serviced by a home gateway, which may be utilized in accordance with an embodiment of the invention. Referring to FIG. 1, there is shown one or more home networks 100, a plurality of delivery networks 110, a plurality of service providers 120A-120N, and a plurality of content providers 130A-130K. Each home network 100 may be serviced by a media gateway 102. Furthermore, the home network 100 may comprise one or more local client device 104.

The service providers 120A-120N may comprise various entities which may provide, using different access technologies or protocols, various services to media gateways 102 and/or to devices serviced thereby. The access technologies and services may include, but are not limited to, network access, multimedia, television, Internet, phone, Ethernet, multimedia over coax alliance (MoCA), and/or passive optical network (PON) access for example. In this regard, at least some of the service providers 120A-120N may comprise network access service providers, providing physical layer connections to the media gateway 102. Such physical layer connections may then be utilized to access content provided by the content providers 130A-130K, access services provided by other ones of the service providers 120A-120N, and/or access to intranets or the Internet at-large. In this regard, "network access service provider" as utilized herein, is distinguished from the more generic term "service provider" which may encompass services other than providing physical access to a network. Cable television providers, plain old telephone service (POTS) providers, digital subscriber line (DSL) providers, cellular providers, WiMAX providers, and satellite providers are examples of network access service providers. In an exemplary aspect of the invention, the media gateway 102 may be operable to connect to multiple service providers 120A-120N to facilitate receiving content originating from one or more of the content providers 130A-130K.

The content providers 130A-130K may comprise various entities and/or networks which may generate, capture, and/or package content that may be distributed to end-users, via the service providers 120A-120N and/or the delivery networks 110. In this regard, content may comprise audio, video, multimedia, e-book, gaming, and/or other content. The delivered content may comprise commercial content, such as content generated by film or television production and/or distribution companies (e.g. Paramount Pictures or Warner Bros.), and/or personal content, such as user-generated content. The content may be, for example, downloadable and/or streaming, rented and/or purchased. Content originating from the content providers 130A-130K may be distributed to the end-users (e.g. consumers) by the service providers 120A-120N.

The content providers 130A-130K and service providers 120A-120N may be separate entities. In some instances, however, a single provider may provide both content and services, as demonstrated by dashed line 140 for example. That is, an entity that functions as a network access service provider may also generate and/or provide content and/or services other than network access and, thus, that entity may also be accurately referred to as a "content provider" and/or a "service provider." The content and/or services that are provided by the content provider and/or the service provider may be provided to the media gateways 102 via one or more physical connections provided by a network access service provider.

The delivery networks 110 may comprise one or more networks that may enable wireless and/or wired communication among a plurality of local and/or remote entities, based on one or more networking and/or communication infrastructures. In this regard, the delivery networks 110 may enable distribution of multimedia content from the content providers 130A-130K, directly and/or via the service providers 120A-120N, to end-users. The network connectivity available via the delivery networks 110 may be based on one or more communication standards and/or protocols. The delivery networks 110 may comprise, for example, Internet 110A, cable network 110B, and/or satellite network 110C, wireless local network area/wide network area (LAN/WAN) 110D, and/or cellular network 110E.

The Internet 110A may comprise a system of interconnected networks to enable exchange of data between a plurality of nodes, based on one or more networking standards, including, for example, the Internet protocol (IP). For example, the Internet 110A may enable connectivity among a plurality of private and public, academic, business, and/or government nodes and/or networks. The physical connectivity may be provided in the Internet 110A via, for example, the Public Switched Telephone Network (PSTN), copper wires, fiber-optic cables, wireless interfaces, and/or other protocols and/or standards-based interfaces. The transport functionality may be performed in the Internet 110A based on, for example, one or more protocols, such as the TCP/IP protocol for example.

The cable network 110B may comprise suitable distribution nodes, systems, and/or subnetworks that may enable forwarding of communication between cable providers and a plurality of consumers. In this regard, the cable network 110B may comprise a network of fiber optics and/or coaxial cables for use in cable broadcasts. For example, in addition to traditional coaxial based networks, the cable network 1108 may comprise one or more passive optical networks (PON) 112 and/or one or more hybrid fiber-coax (HFC) networks 114. Receiving optical signals, delivered via the PON 112 and/or the HFC 114, may require use of dedicated devices, such as optical network unit (ONU) 108B, at the home network 100. The ONU 108B may comprise suitable logic, circuitry, interfaces, and/or code that may be operable to terminate fiber connections, to facilitate receiving of incoming optical signals, and transform them into electrical signals that may be further processed within the home network 100, such as via the media gateway 102. This may enable media gateway 102 to extract multimedia content carried by the optical signals.

The satellite network 110C may comprise suitable distribution nodes, systems, and/or subnetworks that may enable communication of satellite broadcasts by satellite providers to a plurality of consumers. For example, the satellite network 110C may comprise a plurality of orbiting satellite nodes and/or one or more terrestrial centers in a satellite broadcast system. Receiving satellite signals may require use of dedicate devices, such as satellite receiver 108A. The satellite receiver 108A may comprise suitable logic, circuitry, interfaces, and/or code that may be operable to receive incoming satellite signals, and transform them into signals that may be further processed within the home network 100, such as via the media gateway 102, to enable extraction of multimedia content carried thereby.

The LAN/WAN network 110D may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks.

The cellular network 110E may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA2000, High-Speed Downlink Packet Access (HSDPA), Global System for Mobile Communications (GSM), General Packet Radio Services (GPRS), Enhanced Data Rates for Global Evolution (EDGE), and/or other forms of Universal Mobile Telecommunication System (UMTS). The cellular network 110E may comprise, for example, a plurality of control and/or switching nodes, and a plurality of base stations that enable transmission and/or reception of cellular based communications between the cellular network 110E and cellular capable devices Each home network 100 may correspond to a location that may comprise a plurality of devices which may be serviced and/or managed by the media gateway 102. In this regard, the location may be a residence (e.g. home or apartment), a small business, a school, a library, and/or other like settings in which users may want to obtain access to service and/or content provider networks. The media gateway 102 may be utilized in the home network 102 to provide connectivity between the home network 100 and the service providers 120A-120N and/or the content providers 130A-130K, via the delivery networks 110.

The media gateway 102 may comprise suitable logic, circuitry, interfaces, and/or code that may be operable to implement various aspects of the invention. In this regard, the media gateway 102 may be operable to communicate with the content providers 130A-130K, the service providers 120A-120N, and the local client devices 104. In this manner, the media gateway 102 may enable bidirectional communication of content and/or other information between the content providers 130A-130K, the service providers 120A-120N and the client devices 104. To support content delivery operations, the media gateway 102 may function and/or be configured as a cable/satellite set-top box (STB) and/or an Internet Protocol Television (IPTV) gateway. Communications between the media gateway 102 and the content providers 130A-130K and/or service providers 120A-120N may be carried over optical, wired, and/or wireless links of the delivery networks 110. The media gateway 102 may be operable to handle multiple physical layer connections to multiple ones, or portions, of the delivery networks 110, where different ones or portions of the delivery networks 110 are owned, operated, leased, or otherwise associated with different ones of the network access service providers 120A-120N. In some instances, the media gateway 102 may be operable to concurrently communicate over multiple physical connections provided by the multiple network access service providers. For example, the media gateway 102 may be operable to configure and/or utilize one or more connections 108 to the delivery networks 110. The connections 108 may comprise wired and/or wireless connections between the media gateway 102 and the delivery networks 110, which may enable communication between the media gateway 102 and the service providers 120A-120N.

The media gateway 102 may service a plurality of client devices, which may comprise local client device 104 and one or more remote client device 140. The client devices may comprise personal and/or household devices that may be operable to interact with, and/or be communicatively coupled to the media gateway 102. In this regard, the local client devices 104 and/or the remote client devices 140 may comprise content consuming devices. Exemplary client devices may comprise, for example, televisions, computers (desktops or laptops), smartphones, tablets, digital video recorder (DVR), and/or personal video recorder (PVR). Communications between the media gateway 102 and the client devices may be carried over optical, wired, and/or wireless links. The media gateway 102 may interact with the local client devices 104 via links 106, each of which may be supported by the media gateway 102 and the corresponding client device. Exemplary links 106 may comprise High-Definition Multimedia Interface (HDMI) cables, 60 GHz WiGig wireless connections, wired Ethernet connections, WiFi connections, multimedia over coax alliance (MoCA) connections, and/or HomePNA connections. The media gateway 102 may also interact with, and/or service the remote client devices 140. In this regard, the media gateway 102 may interact with the remote client devices 140 indirectly, such as via the delivery networks 110. For example, communication between the gateway 102 and the remote client devices 140 may be performed as IP interactions via the Internet 110A.

The media gateway 102 may operate as an interface device that may allow one or more service and/or content providers to interact with various devices in the home network. In this regard, the media gateway 102 may enable delivering multimedia content to the home network 100 through one or more service providers 120A-120N. For example, the media gateway 102 may be operable to perform such operations as network access processing comprising PHY/MAC, and/or transport layer processing, as well as encryption and/or decryption, user and/or device authentication, and/or video and/or audio processing, to facilitate communication and/or consumption of multimedia content for example.

As illustrated in FIG. 1, a plurality of home networks 100 may be connected to the delivery networks 110, and these home networks 100 may operate in substantially the same manner. Accordingly, by having multiple home networks connected to the delivery networks 110, various applications, such as peer-to-peer communication and/or data aggregation operations may be possible provided by utilizing the media gateways 102 in the home networks 100. For example, client devices 104 in different home networks 100 may communicate peer-to-peer connections, which may be established by corresponding media gateways 102, using direct connection therebetween and/or indirect connections, such as via Internet 110A for example.

While the media gateway 102 is shown in FIG. 1 as a single and separate device, the invention need not be so limited. In one embodiment of the invention, the media gateway functionality may be implemented in a distributed manner over two or more devices. Furthermore, the media gateway may be implemented as a virtual platform, for example in instances where it may be implemented in distributed manner. In another embodiment of the invention, some or all of the functionality of the media gateway may be implemented within one of the televisions available in the home.

In operation, the media gateway 102 may be utilized as an interface device that may allow one or more service providers 120A-120N and/or content providers 130A-130K to interact with various devices in a home network, such as in the home network 100. In this regard, the media gateway 102 may support configuring and/or using the plurality of connections 108. The connections 108 may comprise optical, wired and/or wireless connections between the media gateway 102 and the delivery networks 110, to enable communication between the media gateway 102 and the service providers 120A-120N and/or content providers 130A-130K for example. The media gateway 102 may be operable to perform and/or provide various services that may pertain to enabling and/or facilitating reception of data, such as multimedia content, for example, from one or more content providers, wherein the content may be delivered through one or more services providers. In this regard, content may be delivered to the home network 100 via, and/or may be received by the media gateway 102 from the delivery networks 110. Content delivery may comprise use of traditional content delivery services, comprising traditional terrestrial (over-the-air), cable, and/or satellite delivery services, and/or IP based streaming or downloading. The media gateway 102 may distribute the content to one or more client devices in a home network, for consumption, and/or may perform, directly and/or indirectly using other devices in the home network 100, any processing and/or operations (e.g., decryption and/or account validation) that may be needed to ensure that the content may be consumed properly and/or securely by the target client device(s).

The media gateway 102 may also provide and/or support various other services in the home network 100 beyond reception and/or download of content. For example, the media gateway 102 may be operable to provide and/or support video conferencing applications and/or services. In this regard, at least some of the client devices 104 serviced by the media gateway 102 may be utilized as video conferencing (VC) terminals during video conference calls. During such video conference calls, one or more client devices 104 in the home network 100 may be utilized in capturing and/or generating audio/video (A/V) content corresponding to user input, and/or in playing back A/V content corresponding to user output. The A/V content communicated from and/or to the client devices 104 may be routed and/or forwarded via the media gateway 102. In this regard, the media gateway 102 may utilize its network access physical connections for communicating, via the delivery networks 110, the A/V content associated with video conference calls between client devices 104 in the home network 100 and remote video conferencing (VC) clients. In some instances, the media gateway 102 may enable routing the A/V content associated with video conference calls within the home network 100, such as between different client devices 104, in the home network 100, which are being utilized as video conferencing (VC) clients in the same video conference calls.

In various embodiments of the invention, the media gateway 102 may implement at least a portion of multipoint control unit (MCU) functions during video conferencing (VC) applications. In this regard, in conventional video conferencing operations, dedicated centralized devices, such as centralized Multipoint Control Units (MCUs) may be used in managing, controlling, and/or handling video conferencing related operations. In this regard, conventional centralized MCUs may be located in the core network, and may be utilized to serve a large number of video conferencing clients. The centralized MCUs may be utilized in routing video conferencing communications and/or bridging video conferencing connections, to enable a plurality of video conferencing terminals, and/or intermediary devices servicing these terminals such as gateways, to participate in multipoint video conferences. The main functions of centralized MCUs may comprise video conference control and management, and/or audio/video (A/V) transcoding operations associated with VC clients in particular video conference calls. Use of conventional centralized MCUs, however, may be costly because these MCUs are typically expensive equipment. Accordingly, to eliminate and/or reduce the need for using centralized MCUs during video conferencing operations, at least a portion of centralized MCU functions may be moved to the media gateways. Configuring the media gateways to function as MCUs during video conferencing operations may be made possible because of the media gateway already available control and/or audio/video (A/V) transcoding capabilities, for example.

Use of media gateways to provide MCU functions may be desirable because it may eliminate or reduce the number of conventional centralized MCUs that may otherwise be used during VC operations. Use of media gateways to provide MCU functions may also allow establishing shorter and/or more efficient VC connections, by enabling the VC clients to connect to each other without necessitating traversing all the way up to and/or through the core network, where conventional MCUs may reside. Using shorter peer-to-peer VC connections may enable reducing and/or optimizing network bandwidth and/or load, and may enable incurring less delay/jitter/packet losses since such probability of such losses tend to increase with increases in connection length and/or number of hops required. Use of media gateways to provide MCU functions may also allow the local video content mediums, such as live channels or DVR, to be used as VC channels.

Figure 2:
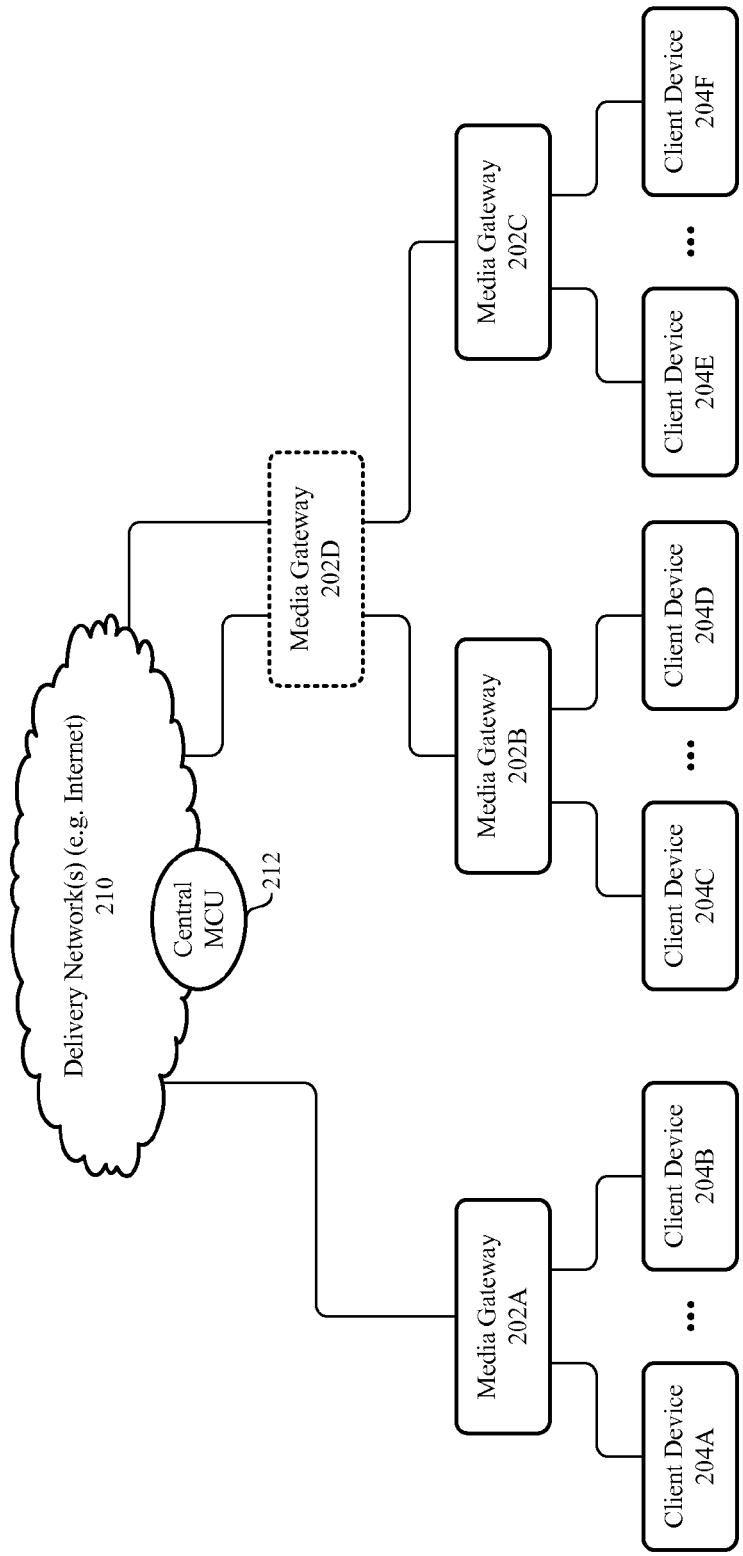
FIG. 2 is a block diagram illustrating an exemplary communication model that may utilize media gateways as Multipoint Control Units (MCUs) during video conferencing (VC) applications, in accordance with an embodiment of the invention.

FIG. 2 is a block diagram illustrating an exemplary communication model that may utilize media gateways as Multipoint Control Units (MCUs) during video conferencing (VC) applications, in accordance with an embodiment of the invention. Referring to FIG. 2, there is shown a plurality of media gateways 202A-202D, plurality of client devices 204A-204F, and a delivery network 210. Also shown in FIG. 2 is a central Multipoint Control Unit (MCU) 212.

Each of the media gateways 202A-202D may be similar to the media gateway 102, substantially as described with regard to FIG. 1. In this regard, each of the media gateways 202A-202D may be operable to service a plurality of client devices.

For example, the media gateway 202A may service client devices 204A-204B; the media gateway 202B may service client devices 204C-204D; and the media gateway 202C may service client devices 204E-204F. In an exemplary aspect of the invention, the client devices 204A-204F may be utilized as video conferencing terminals (or clients) during video conferences among users of these devices.

In operation, the client devices 204A-204F may be utilized in video conferences conducted among users of these devices. In this regard, at least some of the client devices 204A-204F may be operable to function as video conferencing (VC) terminals (or clients) during video conferences. During such video conferences, VC terminals may be utilized to capture and/or generate audio/video (A/V) content corresponding to user input during video conference calls, and may communicate the A/V content to one or more other VC terminals. The VC terminals may also receive, during such video conferences, A/V content from other VC terminals, and may process the received A/V content to generate corresponding audio and/or video for playback as user output. Exchanged A/V content may be communicated during video conference calls via the media gateways servicing the VC terminals, such as media gateways 202A-202D, and/or delivery network 210.

In accordance with conventional video conferencing operations, centralized Multipoint Control Units (MCUs), such as MCU 212, may be utilized in establishing, controlling, and/or managing the video conferences. In this regard, the MCU 202 may receive and/or handle requests for establishment of VC calls among the client devices, and may determine the appropriate routes for exchanging A/V content during established VC calls. For example, the MCU 212 may receive a request from client device 204C, via media gateways 202B and/or 202D, to establish VC call with client device 204E. The MCU 202 may setup the VC call route, such as, for example, to run from client device 204C via media gateways 202B and 202D to MCU 212, and then back to client device 204E, via media gateways 202D and 202C. Furthermore, during VC call the MCU 212 may be operable to perform the required audio/video (A/V) transcoding.

In various embodiments of the invention, at least a portion of multipoint control unit (MCU) functions during video conferencing (VC) applications may be moved to the media gateways. For example, one of more of the media gateways 202A-202D may be operable to implemented at least a portion of the functions of the MCU 212 during VC calls among the client devices 204A-204F. In this regard, the media gateways 202A-202D may be operable to handle such functions as establishing and/or setting VC calls, adaptively and/or dynamically controlling and/or managing the VC calls, and/or performing at least a portion of required A/V transcoding processing. For example, with respect to the example described above, in accordance with an embodiment of the invention, the media gateway 202B may be operable to handle the VC call request sent by client device 204C. The media gateway 202B may be operable to determine and/or establish the VC call routes in lieu of the MCU 212. In addition, because the media gateways 202A-202D may implement various MCU functions, the established VC call routes may be configured without necessitating traversing the delivery network 210 since use of the MCU 212 may not be needed during VC call related operations.

Accordingly, the VC call route may only be established directly via the media gateways 202B, 202C, and 202D. In this regard, the VC call may be established to run from client device 204C via gateways 202B to media gateway 202D, and then back to client device 204E via media gateway 202C. The media gateways 202B and 202C may also be operable to establish the VC call route using direct connection(s) between them. For example, the media gateways 202B and 202C may be operable to establish and/or setup WiFi connections between them, for example, in instances where the media gateways 202B and 202C may be located within WiFi connectivity ranges, and may use such WiFi connection during routing of VC call data between client devices 204C and 204E. The media gateways 202B, 202C, and/or 202D may also be operable to perform the required transcoding associated with the A/V content exchanged between client devices 204C and 204E during the VC call. In this regard, the media gateways 202B, 202C, and/or 202D may be operable to utilize processing and/or transcoding capabilities and/or resources which may be available to support typical operations and/or applications of the media gateways 202B, 202C, and/or 202D.

Figure 3A:
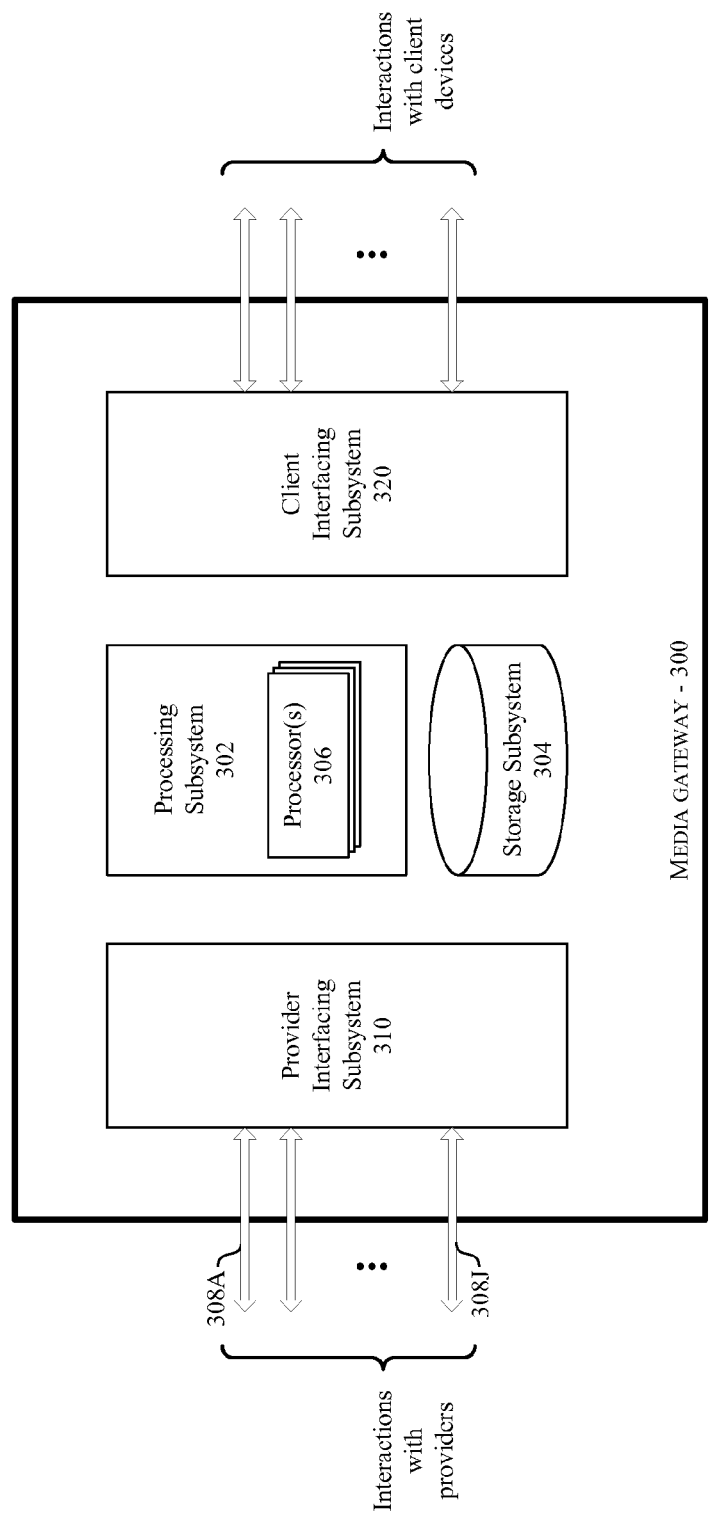
FIG. 3A is a block diagram illustrating an exemplary media gateway that may support integrated processing and control operations during video conferencing (VC) applications, in accordance with an embodiment of the invention.

FIG. 3A is a block diagram illustrating an exemplary media gateway that may support integrated processing and control operations during video conferencing (VC) applications, in accordance with an embodiment of the invention. Referring to FIG. 3A, there is shown a media gateway 300, which may correspond to the media gateway 102 of FIG. 1.

The media gateway 300 may comprise multiple hardware and/or software modules and/or subsystems, such as, for example, a processing subsystem 302, a storage subsystem 304, a provider interfacing subsystem 310, and a client interfacing subsystem 320. In some instances, the media gateway 300 may be implemented such that the various modules listed above may be distributed over multiple devices. Moreover, the modules listed above are provided by way of illustration and not of limitation. Other configurations and/or architectures of the media gateway 300 may be implemented.

The processing subsystem 302 may comprise suitable logic, circuitry, interfaces, and/or code that may be operable to perform control and/or data processing operations in the media gateway 300. The processing subsystem 302 may process data received from the service and/or content providers and/or data received from one or more client devices, such as local client devices in a home network serviced by the media gateway 300. In this regard, the processing subsystem 302 may comprise one or more portions that may be operable to handle certain types of data such as video and/or audio data, for example. The processing subsystem 302 may also be operable to control and/or manage operations of the media gateway 300, and/or executing tasks and/or applications provided therein. In this regard, the processing subsystem 302 may enable execution of applications, programs and/or code which may be stored in the storage subsystem 304, for example. The processing subsystem 302 may be operable to configure and/or control operations of various components and/or subsystems of the media gateway 300, and/or other devices managed by and/or connected to media gateway, by utilizing, for example, one or more control signals. The processing subsystem 302 may also control data transfers within the media gateway 300, in the course of performing various applications and/or tasks for example.

The processing subsystem 302 may comprise, for example, one or more processors 306, which may comprise general purpose processors, such as one or more CPUs, and/or specialized processors, such as one or more dedicated video and/or audio processors. The processor 306 may also comprise one or more secure processors for providing security related operations. While the processing subsystem 302 is shown herein as a single block, the invention needs not be so limited. Accordingly, in instances where the media gateway is implemented a distributed platform, some of the operations and/or functions described herein with regard to the processing subsystems may be performed by different components that may be located in different devices.

The storage subsystem 304 may comprise suitable logic, circuitry, interfaces, and/or code that may be operable to store data utilized in the operations of the media gateway 300. In this regard, the storage subsystem 304 may comprise one or more memory devices that may enable permanent and/or non-permanent storage, buffering, and/or fetching of data, code and/or other information which may be used, consumed, and/or handled in the media gateway 300. For example, the storage subsystem 304 may be utilized to store configuration data, parameters, device information, tracking and/or monitoring information, security information, and intermediate processing data, for example. The storage subsystem 304 may comprise storage media integrated in the media gateway 300 and/or one or more removable storage devices. In this regard, the storage subsystem 304 may comprise different memory technologies, including, for example, read-only memory (ROM), random access memory (RAM), Flash memory, solid-state drives (SSDs), and/or field-programmable gate arrays (FPGAs).

The provider interfacing subsystem 310 may comprise suitable logic, circuitry, interfaces, and/or code that may be operable to communicate data, via one or more physical connections 308A-308J, to one or more corresponding network access service providers, via the delivery networks 110, for example. The provider interfacing subsystem 310 may be operable to support multiple communication protocols, standards, and/or data transport technologies. In this regard, each of the physical connections 308A-308J may connect the gateway 300 to different network access service provider, and may comprise a wired, optical/fiber, or wireless connection. The physical layer connections 308A-308J may utilize different physical media and/or different physical protocols. For example, the connection 308A may comprise a DSL over twisted-pair connection whereas and the connection 308J may comprise a CATV over coaxial cable connection. Accordingly, the provider interfacing subsystem 310 may enable accessing and/or communicating with one or more service providers 120 and/or content providers 130, via the delivery networks 110. The provider interfacing subsystem 310 may also be utilized to communicate data to and/or from third parties. In this regard, the provider interfacing subsystem 310 may enable gateway-to-gateway communication and/or interactions between the media gateway 300 and communication devices located outside the home network 100, directly and/or indirectly through distribution networks corresponding to one or more service providers. The provider interfacing subsystem 310 may enable concurrently communicating with multiple and/or different service/content providers and/or devices.

The client interfacing subsystem 320 may comprise suitable logic, circuitry, interfaces, and/or code that may be operable to communicate with one or more client devices in a home network serviced and/or managed by the media gateway 300, such as the home network 100 of FIG. 1. In this regard, the client interfacing subsystem 320 may enable exchanging data and/or messages with the client devices. The client interfacing subsystem 320 may be operable to support multiple communication protocols, standards, and/or data transport technologies. For example, the client interfacing subsystem 320 may support the links 106a-106j, substantially as describe with regard to FIG. 1.

In operation, the media gateway 300 may be utilized as an interface device that provides connectivity between service and/or content providers and client devices, such as local client devices in a home network, such as the home network 100, serviced by the media gateway 300. The media gateway 300 may enable and/or facilitate reception of content, such as multimedia content, from one or more content providers. The content may be delivered through one or more services providers. For example, the media gateway 300 may communicate with one or more of the service providers 120A-120N, via the provider interfacing subsystem 310, to facilitate transmitting requests to, and/or receiving content from the service providers 130, via one or more of the delivery networks 110. The media gateway 300 may also be operable to communicate with a plurality of client devices in a home network, such as client devices 104 in the home network 100, using the client interfacing subsystem 320. In this regard, the client interfacing subsystem 320 may support use of one or more of the links 106. Thus, the media gateway 300 may be operable to distribute the received content to one or more home devices, for content consumption, and/or may perform, directly via the processing subsystem 302 and/or indirectly using other devices, any processing and/or functions comprising, for example decryption and/or account validation, which that may be necessary to ensure that the content may be consumed by one or more of the target home devices.

In various embodiments of the invention, the media gateway 300 may be operable to handle at least a portion of processing corresponding to video conferencing (VC) services provided to client devices 104 in the home network 100. In this regard, the media gateway 300 may implement, for example, at least a portion of multipoint control unit (MCU) functions during video conferencing (VC) applications and/or services provided via the media gateway 300 in a home network, such as the home network 100. For example, the media gateway 300 may be operable to provide MCU functions such as establishing and/or setting multipoint VC calls, adaptively and/or dynamically controlling and/or managing the VC calls, and/or handling at least a portion of audio/video (A/V) transcoding performed during VC calls. In this regard, various components of the media gateway 300, such as the processing subsystem 302, may be configured to implement and/or support the MCU functions.

The media gateway 300 may be operable to utilize, in supporting VC related applications and/or services, various existing capabilities and/or resources that may typically be utilized during non-VC operations and/or applications in the media gateway 300. For example, the media gateway 300 may be configured to implemented and/or support a plurality of video and/or audio coder-decoders (CODECs) which may typically be utilized to support delivery and/or communication of content by client devices serviced by the media gateway 300. Exemplary CODECs may comprise, for example, H.261, H.263, H.264, MPEG-2, MPEG-4, AVC, VC1 and/or VP6 for video; and WAV, MP3, MP2, WMA, G721, G723, G726, and/or G729 for audio. Accordingly, the CODECs may be employed to support various VC applications and/or services being provided via the media gateway 300. In this regard, the media gateway 300 may utilize available CODECs for transcoding A/V content communicated to and/or from serviced client devices during VC calls. In some embodiments, the media gateway 300 may also be operable to perform and/or support segmentation and/or assembly operation associated with content communication via the media gateway 300. In this regard, during content segmentation, content may be split into a plurality of segments that may be communicated separately. Each of the segments may correspond to data carried in a single transport packet for example. During content assembly, the media gateway 300 may be operable to receive and/or buffer a plurality of segments carrying various portions of the content, and may assemble the content from the received segments.

In an exemplary embodiment of the invention, the media gateway 300 may provide user interface services in the home network. In this regard, the media gateway 300 may be operable to support user interfaces, and/or to generate and/or store data corresponding thereto, which may be utilized to enable interactions between the media gateway 300 and client devices serviced by the media gateway 300, or users thereof. Exemplary user interfaces may comprise graphic user interfaces (GUIs), which may enable visual display and/or interactions. Information inputted and/or outputted using the user interfaces may be stored in the media gateway 300, via the storage subsystem 204 for example. The user interfaces may enable configuring the media gateway 300, the client devices, and/or any applications and/or services provided via the media gateway 300. GUIs, and like interfaces, may be displayed using one or more devices coupled to the media gateway 300.

Figure 3B:
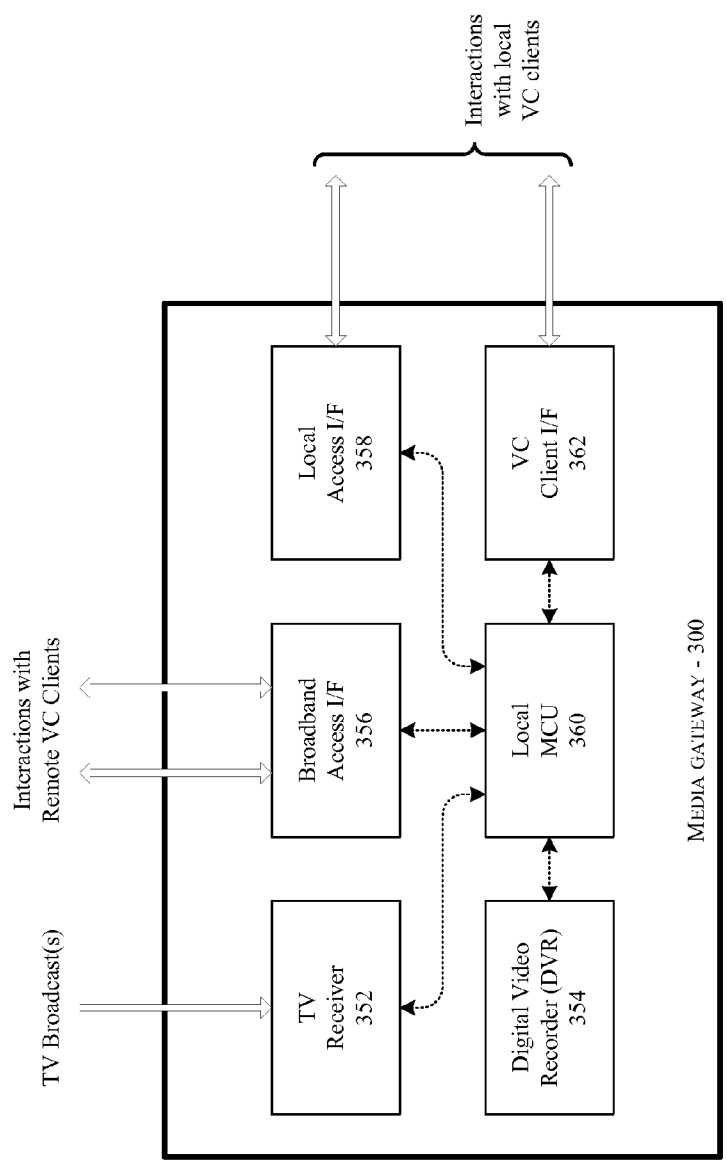
FIG. 3B is a block diagram illustrating various exemplary functions that may be utilized in a media gateway to support integrated processing and control operations during video conferencing (VC) applications, in accordance with an embodiment of the invention.

FIG. 3B is a block diagram illustrating various exemplary functions that may be utilized in a media gateway to support integrated processing and control operations during video conferencing (VC) applications, in accordance with an embodiment of the invention. Referring to FIG. 3B, there is shown the media gateway 300 of FIG. 3A.

The media gateway 300 may be configured to implement various functions that may be utilized during operations of the media gateway 300, such as when servicing a plurality of client devices in a home network for example. In this regard, the functions may be implemented by and/or incorporated into components of the media gateway 300, such as the processing subsystem 302, the storage subsystem 304, the provider interfacing subsystem 310, and/or the client interfacing subsystem 320. In an exemplary aspect of the invention, at least some of various functions implemented by and/or incorporated into the media gateway 300 may be utilized to support and/or facilitate video conferencing (VC) operations. The media gateway 300 may implement and/or incorporate, for example, a TV receiver function 352, a Digital Video Recorder (DVR) function 354, a broadband access interface (I/F) function 356, and a local access interface (I/F) function 358. The media gateway 300 may also incorporate dedicated video conferencing (VC) functions, such as a local multipoint control unit (MCU) function 360 and a video conferencing (VC) client interface (I/F) function 362.

The TV receiver function 352 may comprise suitable logic, circuitry, interfaces, and/or code that may be operable to handle reception of TV broadcasts, which may be received via over-the-air transmissions, cable connections, and/or satellite signals. In this regard, the TV receive function 352 may enable extraction and/or processing of A/V content carried via received TV broadcasts.

The DVR function 354 may comprise suitable logic, circuitry, interfaces, and/or code that may be operable to handle A/V content processing associated with digital video recorder operations. In this regard, the DVR function 354 may enable storage of A/V content, and/or subsequent retrieval thereof during playback operations.

The broadband access I/F function 356 may comprise suitable logic, circuitry, interfaces, and/or code that may be operable to handle broadband accessing operations via the media gateway 300. In this regard, the broadband access I/F function 356 may support establishing and/or utilizing one or more broadband connections, which may enable providing Internet accessibility for example.

The local access I/F function 358 may comprise suitable logic, circuitry, interfaces, and/or code that may be operable to enable and/or support interactions between the media gateway 300 and client devices serviced and/or access via the media gateway 300. In this regard, the local access I/F function 358 may support establishing and/or utilizing one or more wired or wireless connections between the media gateway 300 and client device(s) serviced by the media gateway 300.

The local MCU function 360 may comprise suitable logic, circuitry, interfaces, and/or code that may be operable to support and/or perform one or more functions associated with conventional video conferencing multipoint control unit (MCU). In this regard, the local MCU function 360 may enable the media gateway 300 to handle at least a portion of processing and/or applications associated with video conferencing (VC) services, substantially as described with regard to FIG. 3A.

The VC client I/F function 362 may comprise suitable logic, circuitry, interfaces, and/or code that may be operable to enable and/or support interactions between the media gateway 300 and client devices utilized as video conferencing (VC) terminals during video conferencing applications and/or serviced by the media gateway 300. In this regard, the VC client I/F function 362 may support exchange of data and/or control information between the media gateway 300 and client devices being utilized as VC terminals during video conference calls.

In operation, the media gateway 300 may be operable to support and/or handle video conferencing (VC) applications and/or services, substantially as described with regard to FIG. 3A. In this regard, the media gateway 300 may incorporate and/or implement various functions that may support and/or contribute to VC services and/or applications provided by the media gateway 300. For example, the local MCU function 360 may perform various operations typically associated with conventional multipoint control units (MCUs). The local MCU function 360 may provide, for example, overall control and/or management of VC calls established and/or provided via the media gateway 300. In this regard, the local MCU function 360 may determine and/or set routes for exchanging data and/or control information during the VC calls. The local MCU function 360 may utilize, in this regard, information generated and/or maintained by the media gateway 300 pertaining to client devices, networks, and/or other media gateways.

The local MCU function 360 may utilize the broadband access I/F function 356, the local access I/F function 358, and/or the VC client I/F function 362 to connect to and/or interact with devices that may function as VC terminals and/or devices that may be utilized for routing and/or forwarding of data exchanged between the VC terminals during VC calls. For example, the local MCU function 360 may interact with and/or connect local client devices being utilized as VC terminals via the local access I/F function 358 and/or the VC client I/F function 362. The local MCU function 360 may interact with and/or connect to remote VC terminals via broadband connections that may be established and/or setup using the broadband access I/F function 356.

The local MCU function 360 may also provide and/or perform at least a portion of audio/video (A/V) transcoding performed on A/V content exchanged during VC calls. In this regard, the local MCU function 360 may utilize available A/V transcoding capabilities and/or resources, such as A/V CODECs, which may be incorporated and/or implemented by the TV receiver function 352 and/or the DVR function 354, for use to handle A/V content received via TV broadcasts and/or retrieved during DVR operations.

In an exemplary embodiment of the invention, the media gateway 300 may be operable to implement adaptive latency control and/or management during video conferencing (VC) calls. In this regard, video conferencing latency may comprise latencies and/or delays associated with performing various stages of content communication during VC calls, such as source capture, content encoding, content segmentation, media gateway processing at the source side, network transport, destination-side media gateway processing (if present), content decoding, and/or content playback. In this regard, the media gateway may configure, based on end-to-end latency, which may correspond to the sum of all delays and/or latencies associated with communication of content between VC terminals during VC call, and/or based on knowledge of capabilities and/or resources available in the media gateway and/or in devices communicatively coupled to it, various stages of content handling and/or communication, to modify delay and/or latency associated with each of these stages. This may enable maintaining constant end-to-end latency during the VC calls.

Figure 4:
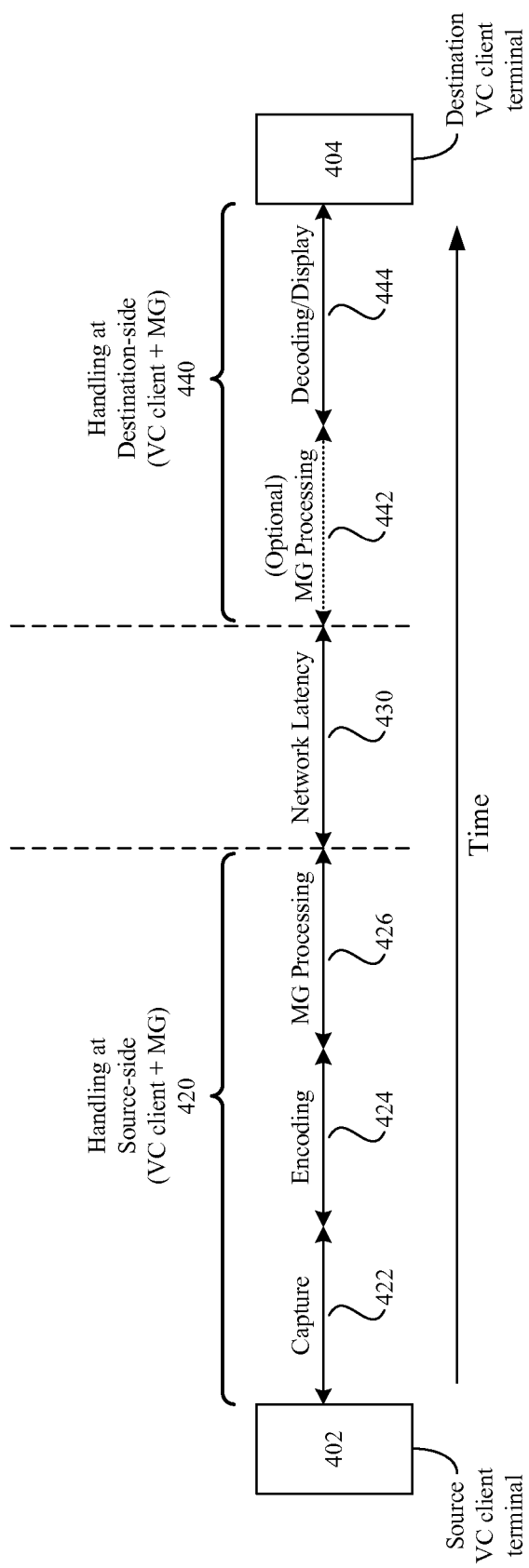
FIG. 4 is a timing diagram that illustrates exemplary handling and/or communicating of content during video conferencing (VC) applications, in accordance with an embodiment of the invention.

FIG. 4 is a timing diagram that illustrates exemplary handling and/or communicating of content during video conferencing (VC) applications, in accordance with an embodiment of the invention. Referring to FIG. 4, there is shown terminals 402 and 404, which may be communicated during video conferencing (VC) call.

In operation, media gateways servicing VC terminals 402 and/or 404 during VC calls, such as the media gateway 300, may be operable to implement and/or incorporate VC related functions such as MCU related functions. In this regard, the media gateway 300 may be operable to adaptively control and/or configure processing latency associated with source VC terminal 402 which may be serviced by the media gateway 300. The source processing latency may be configured based on determination of overall, end-to-end latency associated with delivery of audio/video (A/V) content pertaining to the video conference call, between the source VC terminal 402 and the destination VC terminal 404. In this regard, the end-to-end latency may correspond to the sum of all delays and/or latencies associated with communication of content between VC terminals during VC call. The overall, end-to-end latency may comprise latency associated with source-side video conferencing handling 420, network latency 430, and destination-side video conferencing handling 440. The latency associated with the source-side video conferencing handling 420 may comprise latencies and/or delays associated with various stages of handling of content at the source-side during communication of content from source VC terminal 402 and the destination VC terminal 404. Exemplary source-side content handling stages may comprise content capture or generation 422, content encoding 424, and/or media gateway processing 426, which may include delays associated with content segmentation. The latency associated with the destination-side video conferencing handling 440 may comprise latencies and/or delays associated with various stages of handling of content at the destination-side during communication of content from source VC terminal 402 and the destination VC terminal 404. Exemplary destination-side content handling stages may comprise media gateway processing 442, and latency associated with decoding and playing of received content 444. The network latency 430 may comprise latencies and/or delays associated with transport of the content via delivery network(s) during communication of content from source VC terminal 402 and the destination VC terminal 404. In this regard, the network latency 430 may depend on various factors, such as distance, number and/or type of devices and/or networks traversed during transport of content, and/or available load or bandwidth of each of the traversed networks and/or devices.

The end-to-end latency may be determined and/or monitored based on exchange of latency related information between the media gateways at the source and the destination, which may utilize a control channel, for example, for exchanging control information. The exchanged control information may also comprise user preference information that may be relevant to latency related adjustments. For example, the user preference information may define acceptable level of packet loss, jitter, and/or delay during the VC calls. Using exchanged control information, the media gateway associated with the source VC terminal 402 may be operable to determine, but not configure and/or adjust, the network latency 430 and/or the latency associated with destination-side video conferencing handling 440. The media gateway 300 may be able to configure and/or control, however, latency associated with various stages of the source-side video conferencing handling 420. In this regard, modifying latency associated with the source-side video conferencing handling 420, or certain stages thereof, may enable controlling the overall, end-to-end latency. This may enable maintaining the end-to-end latency, and/or other transport related parameters such as jitter and/or packet loss, within certain range(s), which may be determined, for example, to ensure acceptable user experience during the VC calls.

The media gateway 300 may configure and/or control latency associated with the source-side video conferencing handling 420 by controlling and/or adjusting delay associated with each of the content capture or generation 422, the content encoding 424, and the media gateway processing 426. For example, the latency associated with the content capture or generation 422 may be minimized by using low latency video pre-processing blocks, and/or by increasing the priority of and/or resources utilized by content capture operations. The delay associated with content encoding 424 may be adjusted by configuring and/or modifying encoding operations, such as by selecting among available encoders, and/or adjusting parameters pertaining to encoding operations such as compression rates. In instances where content encoding may incorporate use of segments, encoding modification may also incorporate control and/or adjustment of size of segments. In an exemplary embodiment of the invention, the media gateway 300 may maintain and select among a plurality of encoding profiles. In this regard, each encoding profile may comprise encoding related information or parameters such as, for example, encoding resolution, CODEC type, coding rate, segment size or duration, bit rate, frame rate, temporal correlation and/or coding mode. The latency associated with the media gateway processing 426 may be adjusted by adjusting priority of operations performed during the media gateway processing 426, and/or modifying or controlling allocation of resources utilized during the media gateway processing 426.

Figure 5:
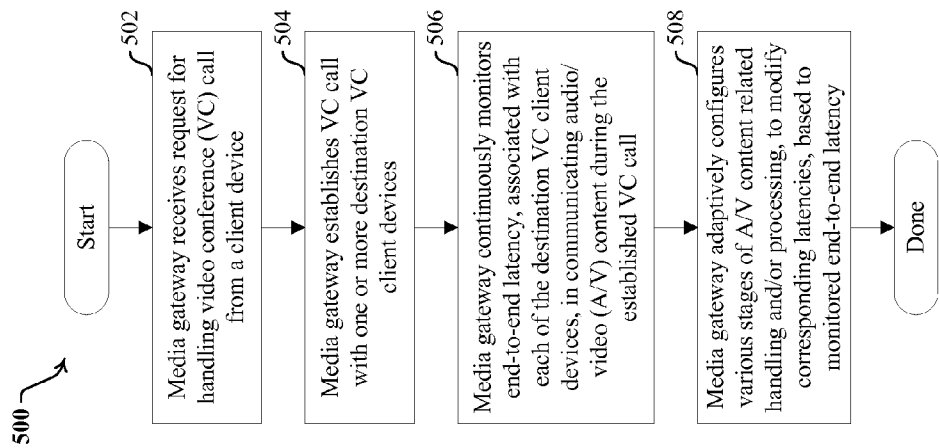
FIG. 5 is a flow chart that illustrates exemplary steps for supporting video conferencing (VC) applications using integrated media gateway processing and control, in accordance with an embodiment of the invention.

FIG. 5 is a flow chart that illustrates exemplary steps for supporting video conferencing (VC) applications using integrated media gateway processing and control, in accordance with an embodiment of the invention. Referring to FIG. 5, there is shown a flow chart 500 comprising a plurality of exemplary steps that may be performed to enable performing integrated media gateway processing and control to reduce latency for 2-way video conference applications during networking.

In step 502, a media gateway, such as the media gateway 300 of FIGS. 3A and 3B, may receive request for handling video conference (VC) call from a client device serviced by the media gateway. In step 504, the media gateway may establish, in response to the received request, a VC call between the requesting client device and one or more destination VC client devices. In this regard, the destination VC client devices may be located within and/or external to a home network serviced by the media gateway. In step 506, the media gateway may continuously monitor, during the VC call, end-to-end latency, associated with each of the destination VC client devices, when communicating audio/video (A/V) content during the established VC call. In step 508, the media gateway may adaptively configure various stages of A/V content related handling and/or processing, to enable modifying corresponding latencies associated therewith, based on monitored end-to-end latency. Exemplary A/V content related handling stages may comprise content capture or generation, content encoding, content segmentation, and/or transmission (of content) related processing in the media gateway.

Various embodiments of the invention may comprise a method and system for integrated media gateway processing and control to reduce latency for 2-way video conference applications. The media gateway 300 may provide and/or support video conferencing (VC) services and/or applications, by handling, for example, at least a portion of video conferencing (VC) processing required during video conference calls between client devices serviced by the media gateway 300 and one or more other video conferencing (VC) terminals. In this regard, the media gateway 300 may perform and/or handle, via the local MCU function 360, one or more functions that are offloaded from one or more centralized video conferencing (VC) multipoint control units (MCUs). Exemplary MCU functions may comprise control and/or management of video conferencing (VC) calls, and/or audio/video (A/V) transcoding associated with content exchanged during the video conferencing (VC) calls. The video conferencing (VC) call control and/or management may comprise determining and/or establishing routing paths utilized in exchanging data during video conference (VC) calls.

The media gateway 300 may adaptively control and/or configure, during VC calls, latency associated with handling and/or communication of data during the VC calls. The latency control and/or configuration may be based on monitoring and/or determination of end-to-end latency associated with exchange of data during the VC calls. In this regard, the end-to-end latency may be monitored and/or determined based on exchange of control information. The control information may be exchanged via control channel(s), and may comprise information pertaining to transport of data and/or user preferences with respect to the VC calls. The adaptive latency control and/or configuration may comprise controlling and/or modifying latencies and/or delays associate with various stages pertaining to handling and/or communication of content during the VC calls, such as content capture 422, content encoding 424, and/or media gateway processing 426. The delays associated with content capture 422, content encoding 424, and/or media gateway processing 426 may be configured and/or adjusted by modifying handling priority and/or resource allocation associated with these stages. Configuring delay associated with content encoding 424 may also be performed by selecting an encoding profile from a set of different encoding profiles, which may comprise information pertaining to audio and video resolutions, coder-decoder (CODEC) types, and/or lengths of audio and video segments.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for integrated media gateway processing and control to reduce latency for 2-way video conference applications.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for use with a media gateway configured to allow communication between a plurality of client devices, the method comprising:
    handling, by the media gateway, at least a portion of video conferencing processing during a video conference call between at least one first client device and at least one second client device of the plurality of client devices, wherein the portion of the video conferencing processing handled by the media gateway is offloaded from a centralized video conferencing multipoint control unit; and
    adaptively controlling, by the media gateway, latencies associated with at least one of handling or communication of data by the at least one first client device during the video conference call.

2. The method according to claim 1, wherein the portion of video conferencing processing handled by the media gateway comprises at least one of video conferencing-related control or video conferencing-related management.

3. The method according to claim 2, wherein handling the at least one of the video conferencing-related control or video conferencing-related management comprises establishing routing paths for exchange of data during the video conference call.

4. The method according to claim 1, wherein handling the portion of video conferencing processing comprises performing at least a portion of one or more audio/video transcoding operations associated with audio/video content exchanged during the video conference call.

5. The method according to claim 1, adaptively controlling the latencies comprising determining an end-to-end latency associated with exchange of data between the at least one first client device and the at least one second client device during the video conference call, the latencies controlled based on the end-to-end latency.

6. The method according to claim 5, the end-to-end latency determined based on control information received via one or more control channels.

7. The method according to claim 1, adaptively controlling the latencies comprising adjusting processing of the media gateway associated with at least one of a content capture, a content encoding, a content segmentation, or a content communication.

8. The method according to claim 7, adjusting processing of the media gateway associated with the at least one of the content capture, content encoding, content segmentation, or content communication comprises modifying at least one of a corresponding handling priority or a resource allocation.

9. The method according to claim 7, adjusting processing of the media gateway associated with the at least one of the content capture, content encoding, content segmentation, or content communication comprises adjusting processing of the media gateway associated with the content encoding and content segmentation by utilizing an encoding profile selected from a set of different encoding profiles, wherein the different encoding profiles comprise at least one of audio and video resolutions, CODEC types, or sizes of audio and video segments.

10. A system, comprising:
one or more circuits for use in a media gateway configured to allow communication between a plurality of client devices, the one or more circuits being configured to:
handle at least a portion of video conferencing processing during a video conference call between at least one first client device and at least one second client device of the plurality of client devices, wherein the portion of the video conferencing processing handled by the one or more circuits is offloaded from a centralized video conferencing multipoint control unit; and
adaptively control latencies associated with at least one of handling or communication of data by the at least one first client device during the video conference call.

11. The system according to claim 10, wherein the portion of video conferencing processing handled by the one or more circuits comprises at least one of video conferencing-related control or video conferencing-related management.

12. The system according to claim 11, wherein the one or more circuits are configured to establish routing paths for exchange of data during the video conference call.

13. The system according to claim 10, wherein the one or more circuits are configured to perform at least a portion of one or more audio/video transcoding operations associated with audio/video content exchanged during the video conference call.

14. The system according to claim 10, wherein the one or more circuits are configured to determine an end-to-end latency associated with exchange of data between the at least one first client device and the at least one second client device during said video conference call.

15. The system according to claim 14, wherein the one or more circuits are configured to determine the end-to-end latency based on control information received via one or more control channels.

16. The system according to claim 10, wherein the one or more circuits are configured to adjust processing of the media gateway associated with at least one of a content capture, a content encoding, a content segmentation, or a content communication.

17. The system according to claim 16, wherein the one or more circuits are configured to adjust processing of the media gateway associated with the at least one of the content capture, content encoding, content segmentation, or content communication by modifying at least one of a corresponding handling priority or a resource allocation.

18. The system according to claim 16, wherein the one or more circuits are configured to adjust the processing of the media gateway associated with the content encoding and content segmentation by utilizing an encoding profile selected from a set of different encoding profiles, wherein the different encoding profiles comprise at least one of audio and video resolutions, CODEC types, or sizes of audio and video segments.

19. One or more computer-readable storage media having instructions stored thereon that, when executed by one or more processors of a media gateway configured to allow communication between a plurality of client devices, cause the one or more processors to perform operations comprising:
handling, by the media gateway, at least a portion of video conferencing processing during a video conference call between at least one first client device and at least one second client device of the plurality of client devices, wherein the portion of the video conferencing processing handled by the media gateway is offloaded from a centralized video conferencing multipoint control unit; and
adaptively controlling, by the media gateway, latencies associated with at least one of handling or communication of data by the at least one first client device during the video conference call.

* * * * *